June 28, 1966 R. G. MILLHISER ETAL 3,257,759
PROCESS FOR SURFACE ALTERING
Filed July 13, 1963 2 Sheets-Sheet 1
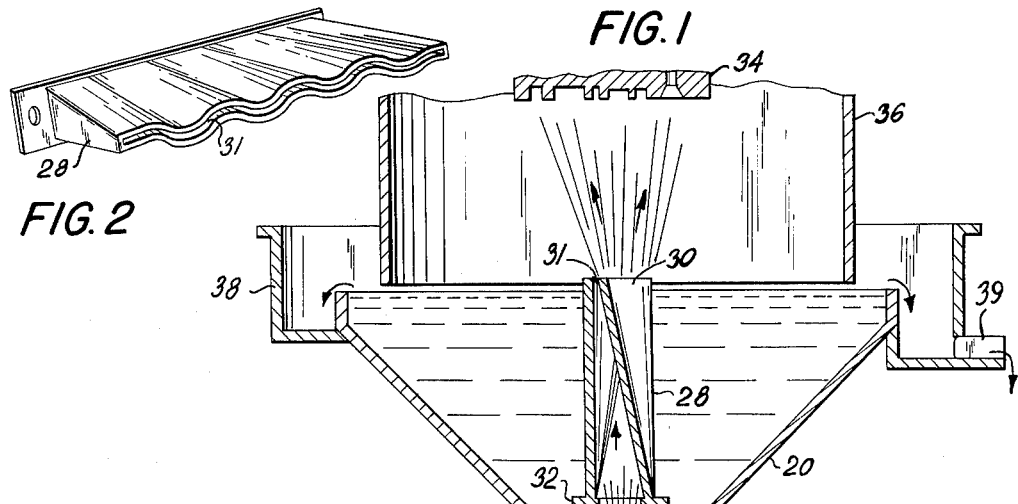
FIG. 1
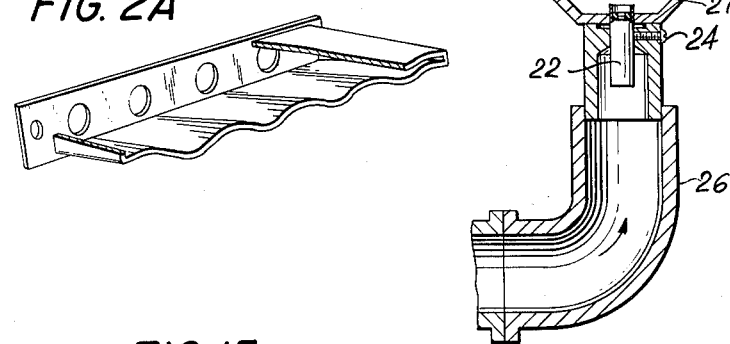
FIG. 2
FIG. 2A
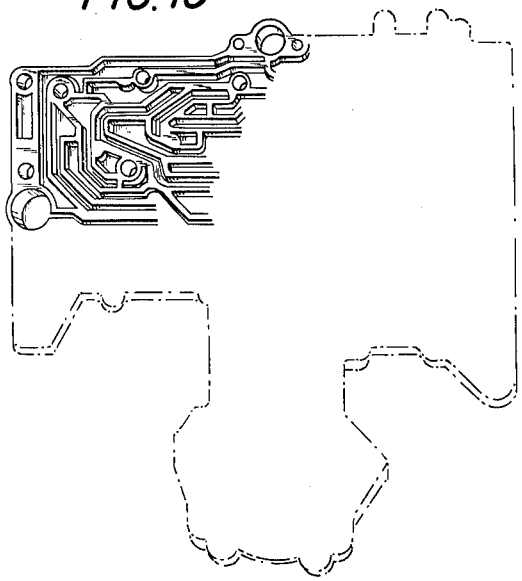
FIG. 15
INVENTORS:
ROBERT G. MILLHISER
RAYMOND C. WINGER
BY
*Curtis, Morris and Safford*
ATTORNEYS INVENTORS:
ROBERT G. MILLHISER
RAYMOND C. WINGER
BY
Curtis, Morris and Safford
ATTORNEYS United States Patent Office 3,257,759
Patented June 28, 1966

3,257,759
PROCESS FOR SURFACE ALTERING
Robert G. Millhiser, Detroit, and Raymond C. Winger, Livonia, Mich., assignors to Ajem Laboratories, Inc., Livonia, Mich.
Filed July 18, 1963, Ser. No. 296,133
6 Claims. (Cl. 51—319)

This invention relates to a process for hydraulic blasting and surface-altering of articles. The invention utilizes hydraulic means for imparting energy to surface-altering particles, such as so-called blasting grit, steel shot and like coarse peening particles used in the process. More particularly, the invention relates to an improved process which is more effective by reason of the impart pattern of the particles on the articles' surfaces.

Among the objects of surface-altering are, for example, removing flash, sprue and other minor protrusions or surface irregularities from metal or plastic articles, removing scale from heat treated metal articles, preparing of predetermined surfaces on metals by abrading, peening or compacting or polishing and the reforming of surfaces of metal articles, e.g., by knocking off undesired surface material, or altering molecular or crystalline arrangements on the surface material. Typical of the application of the invention to such surface treatment is a hydraulic shot peening process.

All of the operations referred to above require "altering" of the surface of the article, i.e., actual displacement of minute portions of surface material in the article, e.g., such energetic treatment of its surface as to alter crystal or molecular arrangements or other physical characteristics. The liquid grit blast procedures with which the invention is concerned have in common the requirement that the solid grit is supplied with sufficient kinetic energy for reforming the surface of the article.

The present invention is an improvement on the methods for reforming, e.g., as is disclosed in patents numbered 3,150,467; 3,160,989; 3,146,550; and 3,192,677, dated September 29, 1964, December 15, 1964, September 1, 1964, and July 6, 1965, respectively, and in the co-pending patent application Serial No. 150,706, filed by our associates on November 7, 1961. The surface-altering particles used in the present invention and the general conditions of use and recovery and reuse may be substantially as in said previously described process and apparatus. When the surface-reforming desired includes abrading, ordinary abrasive particles may be used such as, for example, sharp grits of aluminum oxide, silicon carbide, chopped steel wire (advantageously cut by forcing a V-shaped edge transversely into the wire so as to leave a chisel-like end), or other steel or iron grit, hard alloy grits, or the like, having sufficiently sharp or irregular corners to effect abrasion of the surface against which they are impacted; or, for more readily abraded surfaces, the particles may be of a less tough material, for example iron oxide grains.

When peening is primarily desired, the blasting particles used according to the present invention may be smoother, i.e., relatively free from sharp corners, especially hard, tough shot, e.g., of iron or steel alloys in the form of small spheres or grit which, having been used for abrasive blasting, has its sharp corners worn off to a substantial radius. We may also use, for example, smooth-grained silica or zircon sands although for peening purposes tougher materials are better, as sand grains may be shattered by impact.

A serious problem has appeared in altering surfaces of various articles of manufacture which have relatively long and narrow grooves or slots. Such small passages tend to quickly fill with blasting particles, which shield the surfaces from the action of any grit subsequently striking the same area.

For example, when the surface-altering particles from a nozzle of the older type strike a groove with an incidence such that a substantial length of the groove has its length and width corresponding respectively to the length and width of a nozzle slot, the grooves become at least partially filled with an obstructing accumulation of spent particles so that the effective blasting action is of very short duration.

An object of the instant invention is to provide an economical and dependable method of uniformly altering the surface or articles of manufacture, particularly those which have an irregular surface. It is a further object of the invention to provide nozzles which are better adapted for use in such surface-altering.

According to the present invention, these objects are served by controlling the impact pattern of the blast which carries the blasting particles for the surface treatment of the article. We have found that it is important that during blasting there should always be an open path for escape of the spent blast materials from the surface being blasted, and this we accomplish by so controlling the blast that it leaves an escape area outside the blast which is entering any recess. If the entire recess is blasted at the same time, the incoming blast drives back in any material which is trying to flow out and the impact of the blast is thus cushioned and ineffective for its intended surface reforming. This control is conveniently achieved by use of funnel-like blast tube having a relatively large bore near its base and walls converging to a slot mouth at its end remote from the base, said mouth forming a nozzle for discharge of the blast which is crooked, i.e., turning, meandering, undulating, zig-zag, for example having a sine wave, angular path, or other line not parallel to the target groove, which allows the grit blast to strike into the groove or recess first at one point and then at another as the article is moved along. The sides of the funnel-like nozzle approach and merge smoothly into the slot mouth at narrow angles to the axis of the blast stream, so that the particles of grit carried along with drops of liquid meet the surfaces of the funnel at glancing angles, the grit being lubricated thereon by the liquid so as to minimize abrasion.

These blast tube nozzles direct the blasting particles against the article with incidence such as to blast into recesses in the article. Such progressive treatment allows relatively calm spaces along the recesses in which the particles can escape from the blasting and leave the recessed area rather than being trapped in the area and driven back in after every move toward escape.

In the drawings:
FIGURE 1 is a vertical section through the hopper and blast portions of a simple apparatus producing a fluid jet showing a funnel-like blast tube with meandering nozzle for directing blasting.

FIGURE 2 is a perspective view from beyond the delivery end of a blast tube of meandering configuration for use with articles having narrow and relatively deep recesses.

FIGURE 2A is the equivalent of FIGURE 2 but shown partially sectioned.

FIGURE 15 is an isometric view of a particularly intricate article for which the present invention is well suited.

Figure 3:
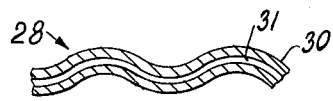
FIGURES 3 through 14 show in cross-section, just below their tips, slot-type nozzles of configurations adapted for use in the method of the present invention.

The typical apparatus of FIGURE 1 includes a container which is a conical hopper 20 which serves both as a catch basin under the blast zone and a hydraulic clarifier. Near the bottom of the hopper is adjustably mounted a jet 22 held by a set screw 24 in the end of pipe 26, which supplies clear water under high pressure.

Above the jet 22 is a blast tube 28, the lower inlet of which is spaced above, but near, the bottom of the hopper; and the upper end of which is formed into a meandering nozzle 30, open only as shown.

The surface-altering grains are supplied into the hopper 20 with the blasting liquid and settle and concentrate in the lower portion of the hopper 20, from which they are picked up by the eductor action of the jet 27 to form the surface-altering blast. At the bottom of the blast tube 28 is shown a laterally projecting flange 32; and the inside of the blast tube is larger near its base that at its outlet nozzle, so that highest velocity occurs only at the slot 31.

Conventional means (not shown) are provided for supplying a high velocity, high pressure liquid for the jet stream emerging from jet pipe 26. This jet entrains grit and/or liquid from around the base of the blast tube and drives it up through the tube 28 and out of its nozzle 30, whereupon it strikes with high kinetic energy the surface of an article 34 held in a target zone directly above the nozzle.

The articles 34 being treated are advantageously carried on a conveyor, e.g., as shown in patents numbered 3,153,882; 3,146,550; and 3,192,677, dated October 27, 1964, September 1, 1964, and July 6, 1965, respectively; and are carried so that the recesses to be surface-altered are askew with respect to the long dimension of the cross-sectional shape of the blast. Thus the blast crosses the recess and effects the surface-altering therein only at spots of intersection; and, as the part is moved, these spots being surface-altered progress along the long dimension of the recess, while always leaving an adjacent area thereof free from the blast for escape of the liquid and the grit which has been spent, i.e., lost its kinetic energy acquired from the liquid jet.

The spent blast liquid and surface-altering grains and such other materials as may have been carried in the original blast, or knocked off from the surface of the article, are kept from scattering by a hood 36 and drain down into the hopper 20 causing an overflow at its rim.

The rim of the hopper is level, so that this overflow uses substantially the entire length of said rim. A gutter 38 collects the overflow and guides it toward an outlet 39. The effluent may be run off to a centrifugal separator, filter, settling basin or pond, in which any remaining fine grit and/or soil is allowed to settle out before the liquid is pumped again into the process.

This overflow carries with it particles having lower settling rates, such as fines, low specific gravity particles and flaky particles. The surface-altering particles settle more promptly and provide at the bottom of hopper 20 a liquid slurry of particles suitable for reuse. Makeup grains, and chemical agents, if used, may be introduced into the hopper as required.

Figure 4:
Figure 5:
Figure 7:
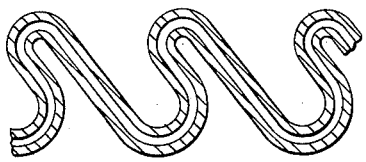
Figure 10:
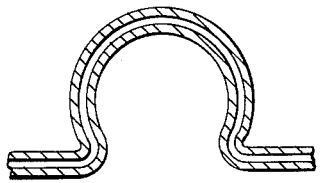
Figure 11:
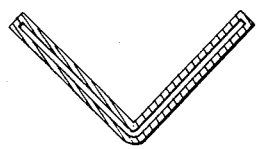
Figure 12:
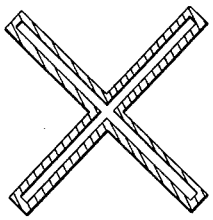

The form of the blast-tube nozzle chosen will depend on surface features of the article being treated. For example, if the article being treated has numerous deep and relatively narrow recesses like those distributed over the casting shown in FIGURE 15, a sine-like nozzle, e.g., as shown in FIGURES 3 or 4, would be appropriate for the process of the present invention. However, if, in addition to the narrow recesses, the casting has areas which require more intensive treatment that other areas, a different nozzle having varying cross-sectional gap along its length may be used, e.g., as shown in FIGURES 5, 7, or 10, wherein the nozzle openings have straight, rather than continuously curved, segments so placed that the areas of the target article requiring the most intensive treatment are passed along the straight runs. Passage under such a nozzle in a direction parallel to the straight portion 41 of the slot orifice results in a relatively more prolonged treatment for those areas of the article which come under the portions 41; and thus the desired intensive treatment can be accomplished. Such a nozzle is shown in FIGURE 5.

Figure 6:
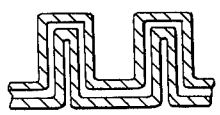
Figure 8:
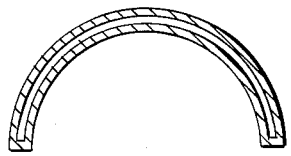
Figure 9:
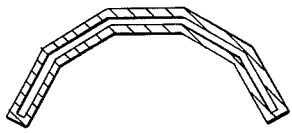
Figure 13:
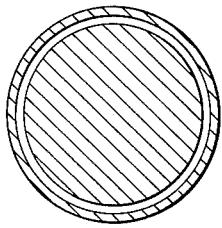
Figure 14:
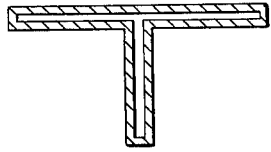

Often other geometrical forms differing from a sine-wave curve may be useful, especially when the surface features of the article being blasted are such that a more intense treatment is required on some parts of the piece than on others. Elongated slits which follow tortuous lines are often advantageous. For example, instead of the continuous curve of the sine wave, we may provide straight line modifications as in FIGURES 4 and 6; or the sine-wave pattern of the nozzle mouth may be modified to a pattern wherein the period frequency and amplitude may be irregular along the length of the nozzle. Furthermore, the curve segments may be shorter or straight lines, even to the extent of providing nozzles wherein the slot is zig-zag comprised of angle segments advantageously right angles (as in FIGURES 4, 6, 9, 11, 12 and 14). Other curved slots are shown in FIGURES 8 and 13. Furthermore, the slots may be modified to comprise arcs or closed conic sections, e.g., an ellipse, of which a circle (FIGURE 13) is one example.

It is to be understood that although these nozzle configurations each have characteristic advantages and can be used to advantage in combination, all embody our broad invention.

Under conditions normally used in industrial hydraulic grit-blasting, the configuration of the nozzle mouth may advantageously be chosen so that the areas requiring the most severe treatment continue longer under the mouth and therefore in the blast. The width of the gap, from lip to lip, across the nozzle mouth may advantageously be chosen so that it is form ½R to 50R (R being the width of a deep, relatively narrow recess). The period of any repetitive form in the nozzle mouth, i.e., the length of the unit form which is repeated, is suitably from R to 100R.

The jet pipe or pipes 22 may be separate, as shown in FIGURE 1, or integral with pipe 26. There may be a series of small jets spaced along the longer transverse dimension of the blast tube for example, as shown in FIGURE 3 of the Patent No. 3,150,467, dated September 29, 1964, or a single transversely elongated jet mouth as shown in FIGURE 2 of said patent.

The method of the instant invention also comprises using equipment having a slot-shaped ribbon-blast producing blasting tube described in co-pending Patent No. 3,150,647, dated September 29, 1964. For example, by passing the grooves of an article to be treated into a ribbon blast at a sufficient angle so that there would be room for the escape of spent grit from the groove, the article would be treated advantageously by the method of the invention. However the present invention provides a more suitable method for accomplishing the treatment of such articles by means of crooked and meandering slots which cannot be aligned with the grooves and recesses on the article to be treated, and can be used to treat several distinct areas of such grooves and recesses at the same time.

In this application and accompanying drawings, we have shown and described a preferred embodiment of our invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited to the condition of a particular case.

We claim:

1. The method of surface-altering by hydraulic blasting with hard particles which comprises forcing a hydraulic fluid into a jet, entraining said blasting particles in the liquid of said jet, forming the resulting blast into a crooked cross-section and directing said formed blast against surfaces in narrow recesses of articles, at isolated spots, leaving adjacent spots in said recess open for escape of spent blasting particles and fluid.

2. A process for hydraulic blasting wherein blasting particles are entrained by an hydraulic jet and impelled thereby against articles to be surface-altered, which process is characterized by the improvement comprising directing the resulting hydraulic blast of said particles against surfaces of narrow recesses on said article, giving said blast a cross-section shaped different from said recesses whereby the blast strikes the recessed surfaces at isolated spots thereon, and moving the article relative to said blast in a direction at an angle to the length of recesses thereby progressively blasting said surfaces, thus facilitating escape of blasting particles from said recess surfaces after said particles have lost kinetic energy of the blast.

3. The process as defined in claim 2 wherein the hydraulic blast is given a shape, as it leaves the slot mouth of said nozzle, which follows a sine-like zig-zag.

4. The process as defined in claim 2 wherein the hydraulic blast is given a shape, as it leaves the slot mouth of said nozzle, which follows an angular zig-zag.

5. A process for hydraulic blasting wherein blasting particles are entrained by a hydraulic jet impelled thereby against an article to be surface-altered, which process is characterized by the improvement comprising forming the resulting hydraulic blast of said particles into a curvilinear cross-section and directing said blast against a surface of said article which is to be altered thereby, and causing said surface to move relative to said blast, the cross-section of said blast being curvilinear by reason of having a part thereof which extends in the direction of said moving aligned with the parts of said article on which greater surface-altering is desired.

6. A process for fluid-impelled particle blasting of articles having recesses comprising forming the abrasive blast into a curvilinear cross-section; directing said formed blast against said article which is to be altered thereby, and moving said article relative to said blast whereby the blast strikes the recesses at isolated spots thereon leaving adjacent spots in said recesses open for escape of spent blasting particles and fluid.

References Cited by the Examiner

UNITED STATES PATENTS

| | | | |
|---|---|---|---|
| 252,979 | 1/1882 | Tilghman et al. | 51—11 X |
| 1,125,232 | 1/1915 | Weyl | 51—319 |
| 2,040,715 | 5/1936 | Smith | 51—321 |
| 2,605,596 | 8/1952 | Uhri | 51—321 |
| 2,876,601 | 3/1959 | McFaddan | 51—321 |
| 3,069,812 | 12/1962 | Shelton | 51—11 |
| 3,102,368 | 9/1963 | Smith | 51—11 |
| 3,150,467 | 9/1964 | Umbricht et al. | 51—8 |

LESTER M. SWINGLE, *Primary Examiner.*

J. SPENCER OVERHOLSER, *Examiner.*

L. J. SHECHTER, *Assistant Examiner.*